United States Patent
Khawand (10) Patent No.: US 7,415,273 B2
(45) Date of Patent: Aug. 19, 2008

(54) EFFICIENT SYSTEM AND METHOD OF MONITORING NEIGHBORING CELLS IN A COMMUNICATION SYSTEM

(75) Inventor: Charbel Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 389 days.

(21) Appl. No.: 10/821,434

(22) Filed: Apr. 9, 2004

(65) Prior Publication Data

US 2005/0227701 A1    Oct. 13, 2005

(51) Int. Cl.
     H04Q 7/20 (2006.01)
(52) U.S. Cl. ................ 455/434; 455/439; 455/453; 455/452.1
(58) Field of Classification Search ........ 455/435.1, 455/434, 450, 452.2, 453, 509, 513, 515, 455/439, 574, 452.1
     See application file for complete search history.

(56) References Cited

U.S. PATENT DOCUMENTS

| | | | | |
|---|---|---|---|---|
| 5,353,332 | A * | 10/1994 | Raith et al. | 455/455 |
| 6,038,449 | A * | 3/2000 | Corriveau et al. | 455/439 |
| 6,308,066 | B1 | 10/2001 | Ranta et al. | |
| 6,327,472 | B1 * | 12/2001 | Westroos et al. | 455/450 |
| 6,363,252 | B1 * | 3/2002 | Hamalainen et al. | 455/436 |
| 6,385,456 | B2 * | 5/2002 | Menzel | 455/452.2 |
| 6,418,127 | B1 | 7/2002 | Laurent | |
| 6,449,482 | B1 * | 9/2002 | Johansson et al. | 455/443 |
| 6,463,054 | B1 * | 10/2002 | Mazur et al. | 370/352 |
| 6,515,971 | B2 | 2/2003 | Nelson et al. | |
| 6,526,286 | B2 | 2/2003 | Wan | |
| 6,970,708 | B1 * | 11/2005 | Raith | 455/440 |
| 2002/0107025 | A1 * | 8/2002 | Oliveira | 455/452 |
| 2002/0193111 | A1 | 12/2002 | Wallstedt et al. | |
| 2003/0181208 | A1 * | 9/2003 | Lobinger et al. | 455/443 |
| 2003/0224730 | A1 * | 12/2003 | Muszynski et al. | 455/62 |
| 2004/0022226 | A1 * | 2/2004 | Edlund et al. | 370/338 |
| 2004/0192326 | A1 * | 9/2004 | Stern-Berkowitz et al. | 455/453 |
| 2004/0266474 | A1 * | 12/2004 | Petrus | 455/525 |
| 2005/0136937 | A1 * | 6/2005 | Qian et al. | 455/452.2 |

OTHER PUBLICATIONS

Yanover, V., "Handover in 802.16e MAC," IEEE 802.16 Presentation Submission Template, http://www.ieee802.org/16/tge/contrib/S80216e-03_01.pdf, Site Last Visited Apr. 9, 2004.

* cited by examiner

Primary Examiner—William Trost
Assistant Examiner—Marivelisse Santiago

(57) ABSTRACT

A portable communication device (150) can include a transceiver (74) and a processor (76) coupled to the transceiver. The processor can be programmed to monitor at least one neighboring cell among a plurality of cells for a load condition on the at least one neighboring cell, monitor the at least one neighboring cell for a service capability and discontinue the monitoring of the at least one neighboring cell if a desired service capability fails to match the service capability of the at least one neighboring cell or if the load condition fails to meet a predetermined load condition. The processor can be further programmed to monitor the at least one neighboring cell for a signal quality indication and to discontinue the monitoring of the at least one neighboring cell if the signal quality indication falls below a predetermined threshold.

24 Claims, 9 Drawing Sheets

EFFICIENT SYSTEM AND METHOD OF MONITORING NEIGHBORING CELLS IN A COMMUNICATION SYSTEM

CROSS-REFERENCE TO RELATED APPLICATIONS

Not applicable

FIELD OF THE INVENTION

This invention relates generally to communication systems, and more particularly to a communication system that intelligently monitors neighboring cells.

BACKGROUND OF THE INVENTION

In any mobile communication system, channel capacity and communication resource availability is a concern for both the system operator and mobile users. Mobile users desire to have readily available access to communication resources, and system operators want to maintain a level of quality in the communication resources they offer so that even when a particular cell or serving area is operating at capacity, other users in the serving area who desire access to communication resources do not interfere with users presently using communication resources. In other words, packet data and internet protocol based networks allow for a negotiation of service. Mobile stations or units usually negotiate a certain Quality of Service (QoS) with their core network before they are granted a dedicated data channel. This negotiation differs from one system to another. However, common to all systems is that most service requests are duplicative in terms of data rates, spreading factors, mean packet delay and packet loss for examples. The negotiation for service such as Motorola Push-to-Talk (PTT) Dispatch, can also be seen as a repeat each time the mobile station makes a request for service (e.g. Dispatch users). Furthermore, commencing the negotiation does not guarantee a granted service connection. A non-guaranteed scenario is certainly true in crowded areas. In addition, the time it takes a mobile unit to realize success or failure is usually long enough to cause wasted battery life and increased system noise with no guarantee of service. This problem occurs in a Voice over IP (VoIP) network as well as conventional circuit switched networks.

SUMMARY OF THE INVENTION

In order to solve the problem described above, embodiments in accordance with the invention utilize an early part of the decision process of the negotiation stage. Namely, the appropriate neighbor cells are chosen intelligently to measure and initiate them as serving cell candidates based on at least one among their system loading indicators, their service capability and their signal quality.

In one embodiment of the present invention, an efficient method of monitoring neighboring cells in a communication system can include the steps of monitoring at least one neighboring cell among a plurality of cells for a load condition on the at least one neighboring cell, monitoring the at least one neighboring cell for a service capability, and discontinuing the monitoring of the at least one neighboring cell if a desired service capability fails to match the service capability of the at least one neighboring cell or if the load condition fails to meet a predetermined load condition. The service capabilities can be private call, dispatch, and short messaging service for example. The service capabilities can also signify a particular quality of service, a spreading factor, The method can further include the steps of monitoring the at least one neighboring cell for a signal quality indication and discontinuing the monitoring of the at least one neighboring cell if the signal quality indication falls below a predetermined threshold. Note, the step of monitoring for the signal quality indication can be monitoring for a signal quality estimate (SQE) and the step of discontinuing the monitoring can include abstaining from monitoring the at least one neighboring cell for a period of time. Also note that the step of monitoring the load condition can include the step of monitoring a load condition for each of the service capabilities supported on the at least one neighboring cell. Monitoring the load condition and the service capability can be done by deciphering by a portable communication unit a codeword transmitted by the at least one neighboring cell. The method can further include the step of camping on the at least one neighboring cell if the desired service capability matches the service capability of the at least one neighboring cell, the -load condition falls within a predetermined load condition, and the signal quality indication meets or exceeds the predetermined threshold.

In a second aspect of the present invention, a portable communication device can include a transceiver and a processor coupled to the transceiver. The processor can be programmed to monitor at least one neighboring cell among a plurality of cells for a load condition on the at least one neighboring cell, monitor the at least one neighboring cell for a service capability and discontinue the monitoring of the at least one neighboring cell if a desired service capability fails to match the service capability of the at least one neighboring cell or if the load condition fails to meet a predetermined load condition. The portable communication device can be a communication device such as a cellular phone that operates on at least one communication protocol selected among GSM, iDEN, UMTS, TDMA, GPRS/EDGE, CDMA, and WCDMA. Of course, the embodiments are not necessarily limited to the protocols listed and can certainly encompass others. within the scope of the claimed invention. The processor can be further programmed to monitor the at least one neighboring cell for a signal quality indication and to discontinue the monitoring of the at least one neighboring cell if the signal quality indication falls below a predetermined threshold. The processor can also be programmed to monitor a load condition for each of the service capabilities supported on the at least one neighboring cell. The processor can monitor the load condition and the service capability by deciphering a codeword transmitted by the at least one neighboring cell. The processor can further be programmed to cause the device to camp on the at least one neighboring cell if the desired service capability matches the service capability of the at least one neighboring cell, the load condition falls within the predetermined load condition, and the signal quality indication meets or exceeds the predetermined threshold.

In a third aspect of the present invention, a cellular communication system can include a portable communication unit having a transceiver and a processor coupled to the transceiver, and a plurality of cells, at least one cell among the plurality of cells including a transmitter that transmits an indication of a load condition and a service capability for the at least one cell. The processor in the communication unit can be programmed to monitor the at least one cell among a plurality of cells for the load condition and the service capability on the at least one cell and discontinue the monitoring of the at least one cell if a desired service capability fails to match the service capability of the at least one neighboring cell or if the load condition fails to meet a predetermined load condition. The processor can be further programmed to monitor the at least one cell for a signal quality indication and to discontinue the monitoring of the at least one cell if the signal quality indication falls below a predetermined threshold.

DETAILED DESCRIPTION OF THE DRAWINGS

Figure 1:
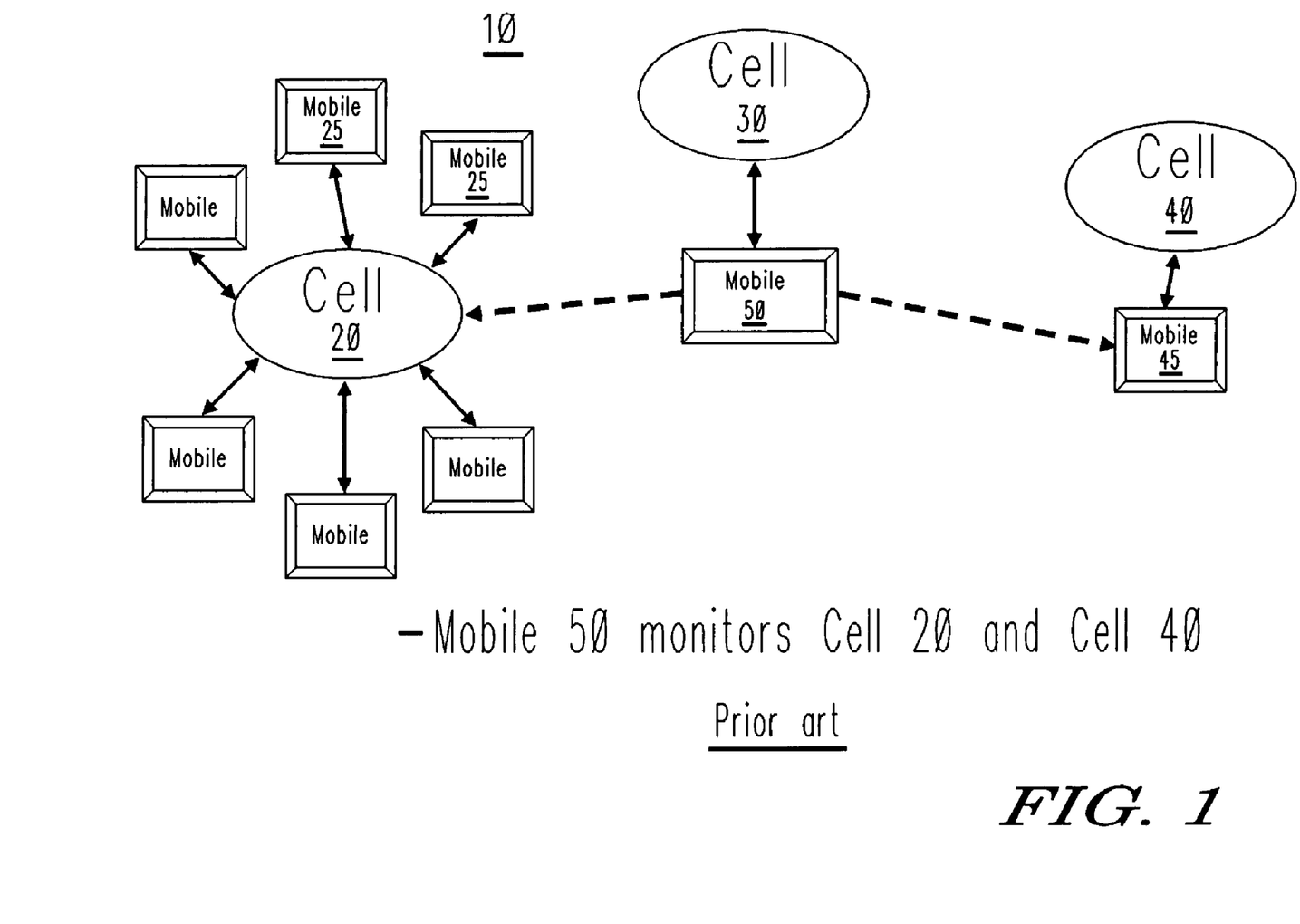
FIG. 1 is a block diagram of an existing communication system.
Figure 2:
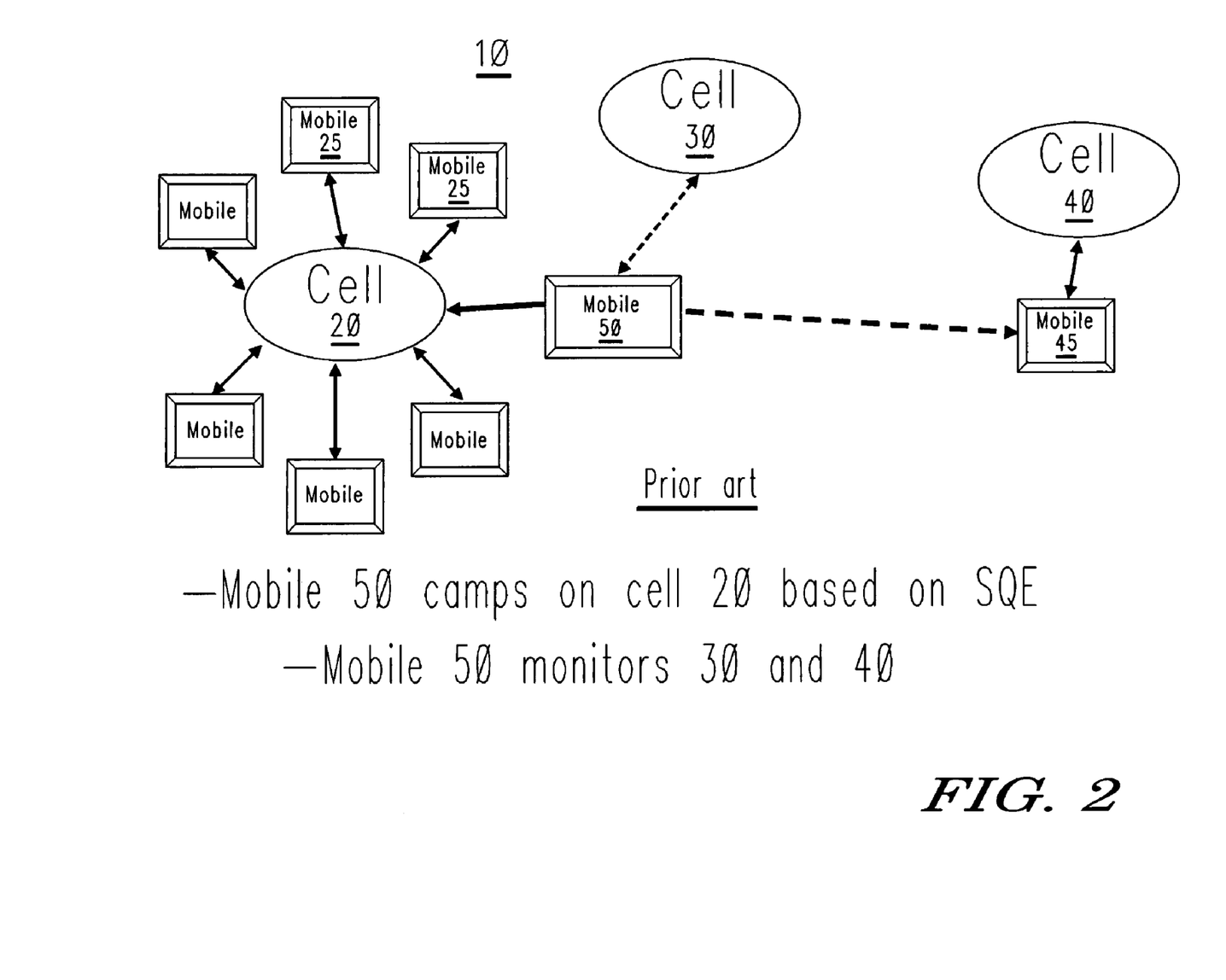
FIG. 2 is a block diagram of the existing communication system of FIG. 1 illustrating needless camping by a mobile unit.
Figure 3:
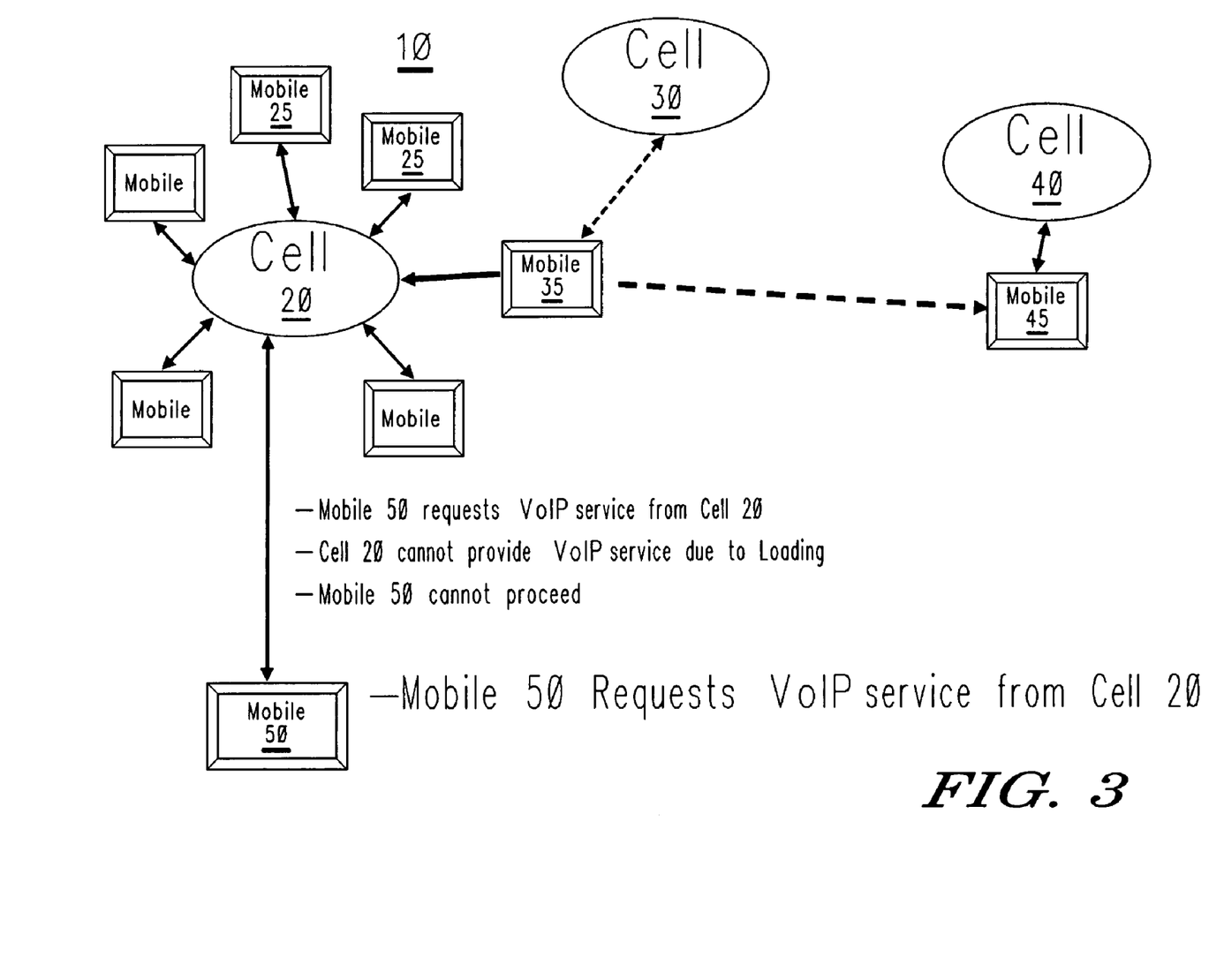
FIG. 3 is a block diagram of the existing communication system of FIG. 1 illustrating a needless communication request.

Referring to FIGS. 1-3, an existing communication system 10 is illustrated having a plurality of cells 20, 30, 40 and a plurality of mobile communication devices in communication with such cells. As shown in FIG. 1, a mobile communication unit 50 is in communication with cell 30 while the unit 50 monitors neighboring cells 20 and 40. Note that cell 20 has a potentially loaded communication channel with a plurality of mobile communication units 125 in communication with cell 20. Also note that unit 50 monitors cell 40 via another mobile communication unit 45 in communication with cell 40. When mobile communication units monitor or "camp" on serving cells they expect certain services to be met. For instance, it is not sufficient to camp on a cell, but to also be able to take advantage of the services offered. If a dispatch user camps on a new cell, it requires dispatch services to be extended to it. However, the mobile communication unit today cannot tell which neighbor can or cannot meet its service needs until it actually camps on the new cell and requests a service from the new cell. Such scenarios are illustrated in FIGS. 2 and 3. In FIG. 2, mobile communication unit 50 camps on cell 20 based on a signal quality measurement such as SQE. The mobile communication unit then monitors neighboring cells 30 and 40. In FIG. 3, the mobile communication unit requests a service such as VoIP service from cell 20. Due to (over) loading on cell 20, cell 20 cannot provide VoIP service and thus mobile communication unit 50 cannot proceed to communicate via cell 20. The scenarios in FIGs. 2 and 3 illustrate a waste of battery life and an injection of channel noise that could deteriorate the performance on cell 20 for all users.

Figure 4:
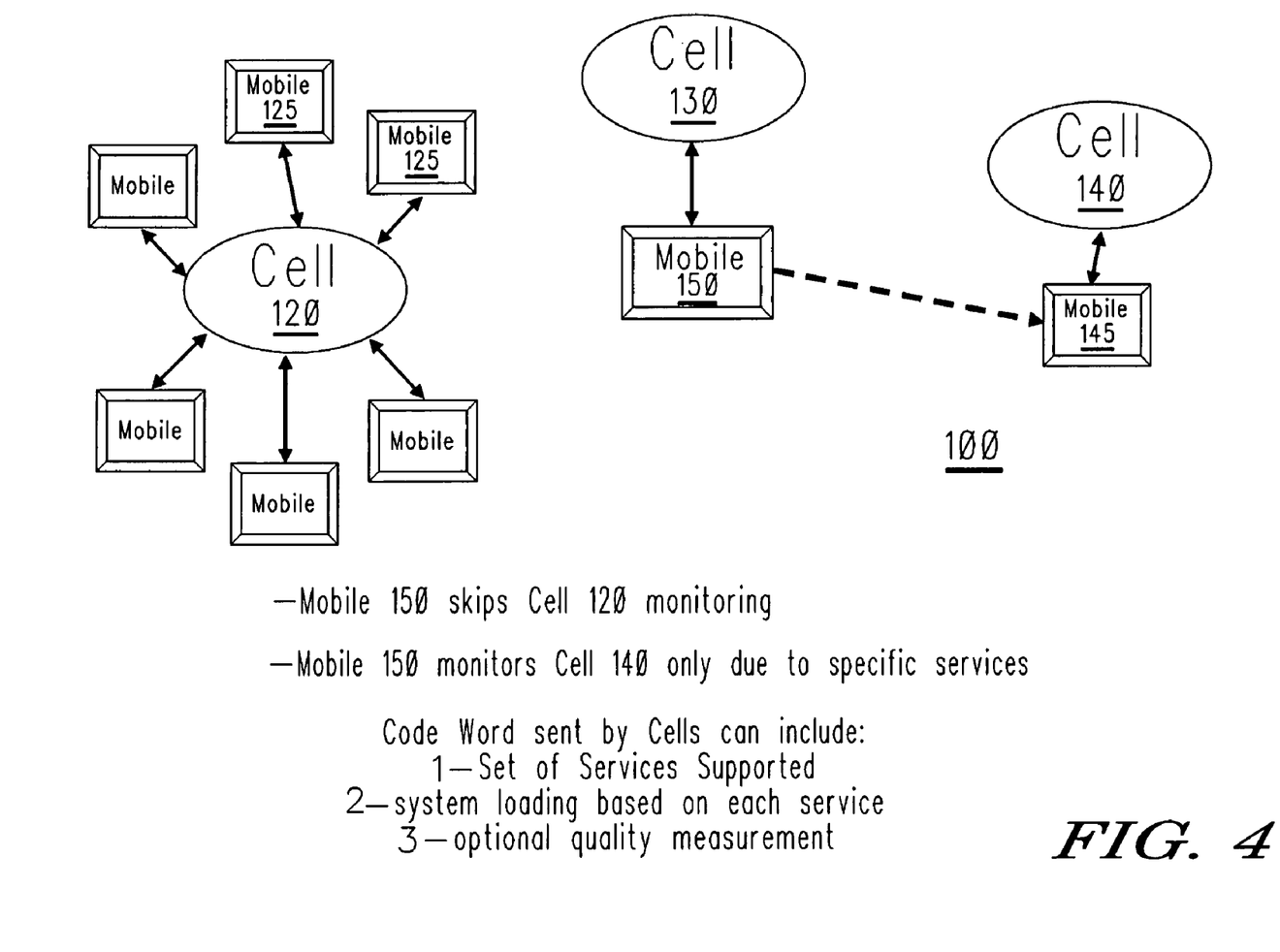
FIGS. 4-6 are block diagrams of a communication system operating in accordance with an embodiment of the present invention.
Figure 5:
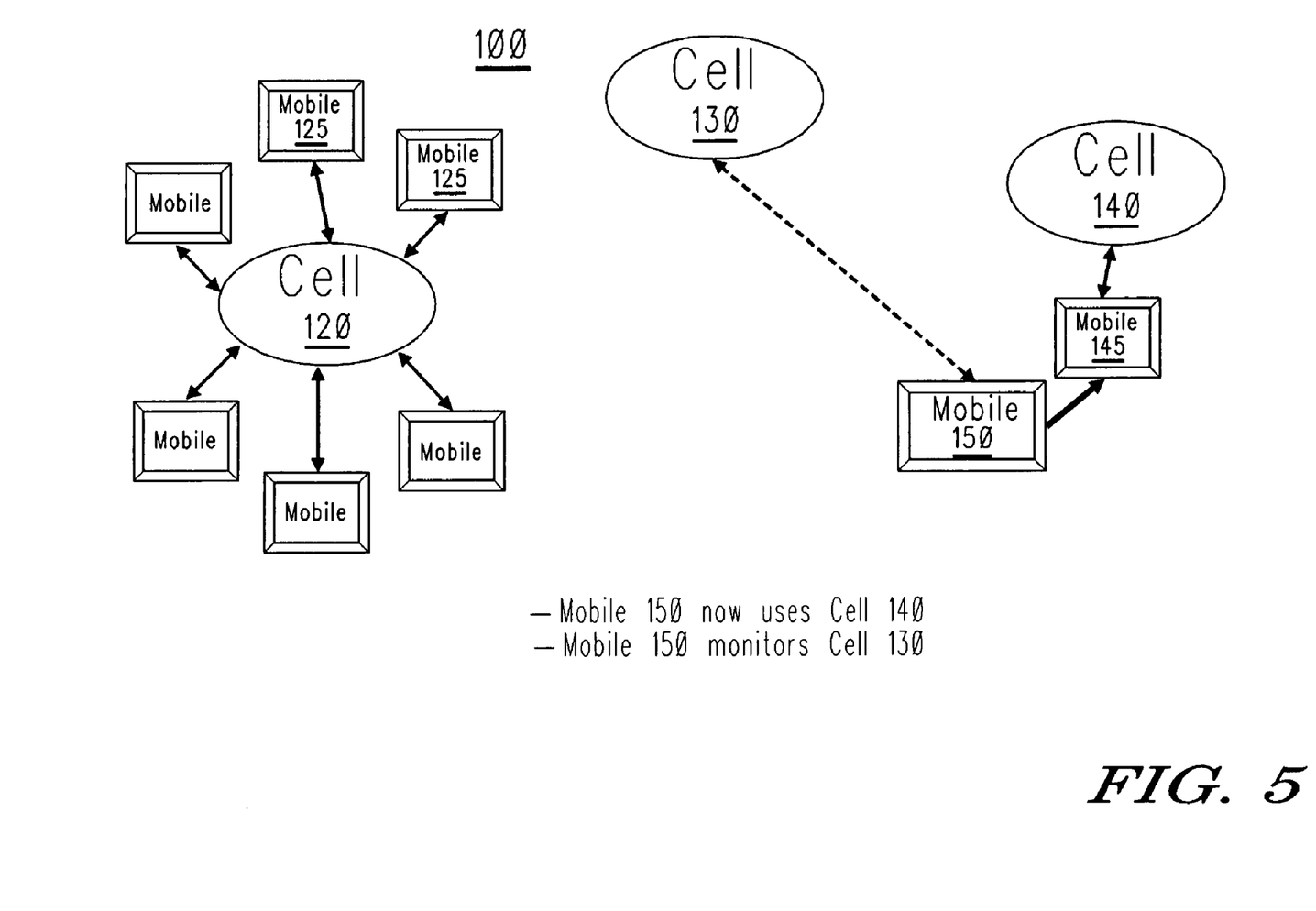
Figure 6:
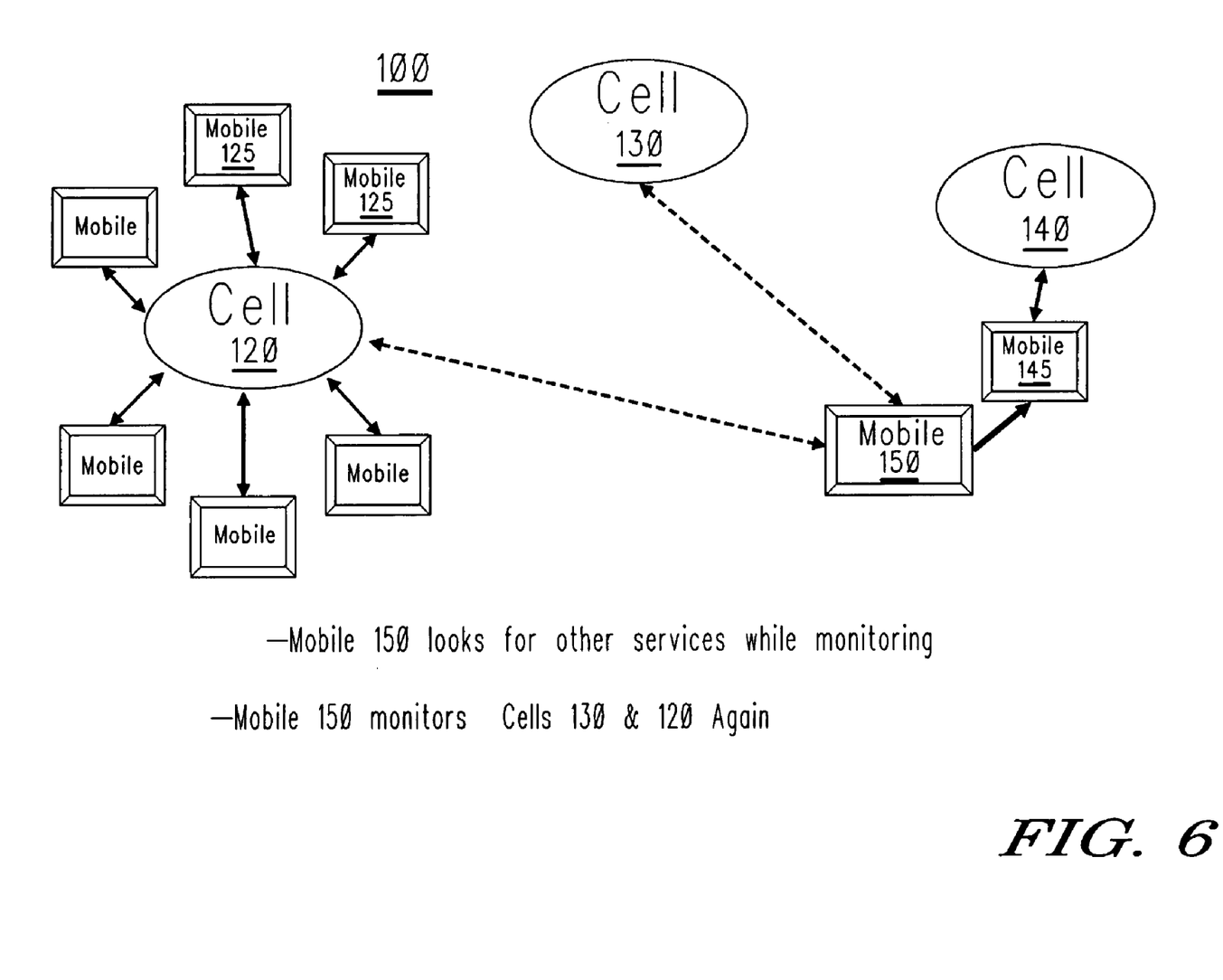

Instead, embodiments in accordance with the present invention as shown in FIGS. 4-6 provide a way for mobile communication units to learn which neighboring cells are worth monitoring. In this manner, the mobile unit skips the monitoring of unusable cells and provides battery saving. Referring to FIG. 4, a communication system 100 having a plurality of cells 120, 130, 140 and a plurality of mobile communication devices (125, 145, and 150) in communication with such cells is shown. As shown, a mobile communication unit 150 is in communication with cell 130 while the unit 150 monitors neighboring cell 140 via mobile communication unit 145. The unit 150 skips monitoring of cell 120 and only monitors cell 140 for specific services. One way to determine which neighboring cells are worth monitoring is by reading a code or codeword sent by the cells. The code or codeword or codewords can include such information as the set of services supported by the cell, the system loading based on each service, and an optional quality measurement. Of course, such codes or codewords can also indicate other information useful in making a determination whether to monitor a neighboring cell. For example, in one embodiment, such codeword or codewords can also provide an indication or a forecast of not only its current channel loading but also its projected service loading for subsequent timeslots. As, shown in FIG. 5, the mobile communication unit 150 can use a neighboring cell such as cell 140 while monitoring other neighboring cells such as cell 120. Unit 150 no longer needs to monitor cell 120 (or at least can postpone monitoring of cell 120 for a predetermined period of time) knowing that it either does not provide a desired service, exceeds a predetermined loading threshold or fails to meet a predetermined loading condition, or fails to meet a minimum signal quality level threshold. Referring to FIG. 6, the mobile communication unit 150 can look for other services while monitoring. In this instance, the unit 150 can monitor cells 120 and 130 again. Monitoring previously undesired cells can occur due to changes in circumstances including a change in services desired by the user or a timing out of the command to skip monitoring of the undesired cell.

Choosing the right neighbor as a potential serving cell based on any combination of the services that it provides, the total loading or loading condition of each service supported and signal quality measurements (such as SQE) can generate more channel capacity, more battery life, better user experience and a better balance of over-the-air resources. Making better use of the monitoring window that a mobile communication unit looks at to measure neighboring cell SQE can improve the efficiency of existing systems. Today, in any of the existing available systems such as GSM, WCDMA, CDMA, TDMA and iDEN, the mobile communication units make an SQE reading to qualify neighbor cells. The frequency of neighbor cell measurements vary, but it is commonly quite frequent. Embodiments in accordance with the present invention do not necessarily increase the measuring window nor does it contribute to any battery life reduction. Instead, various implementations can read a window with useful additional information rather than just random I & Q data measurements. It suggests a neighbor cell measurement window where the IQ symbols can mean three things:

1—Services supported
2—Load measurements or conditions for each service supported
3—SQE As previously mentioned, this information can be contained in a code or codeword that the mobile communication unit can decipher to extract the service supported and the process load or load condition of each of those services at the time of measurement or monitoring.

As noted above, choosing the right neighbor as a potential serving cell is solely based on a SQE value in today's existing systems. Not only using an optional SQE measurement, but also a load condition or a service measurement will increase overall efficiency for most communication systems. Instead of having each mobile station measuring all potential neighbors and determining after camping that a cell does not support a service or fails to have the bandwidth to support the service, the mobile communication unit can abstain from measuring this neighbor (for a random time for example) and moves on to the next. This system at least guarantees that the mobile communication unit smartly chooses a neighboring cell to provide its needs once it camps on the new cell. For a dispatch user, this could mean a difference between a Push-to-talk (PTT) busy (e.g. bonk) and a PTT going through. In addition, cells can balance themselves by moving future mobile camping candidates away to other neighbors, thus balancing themselves better.

Figure 7:
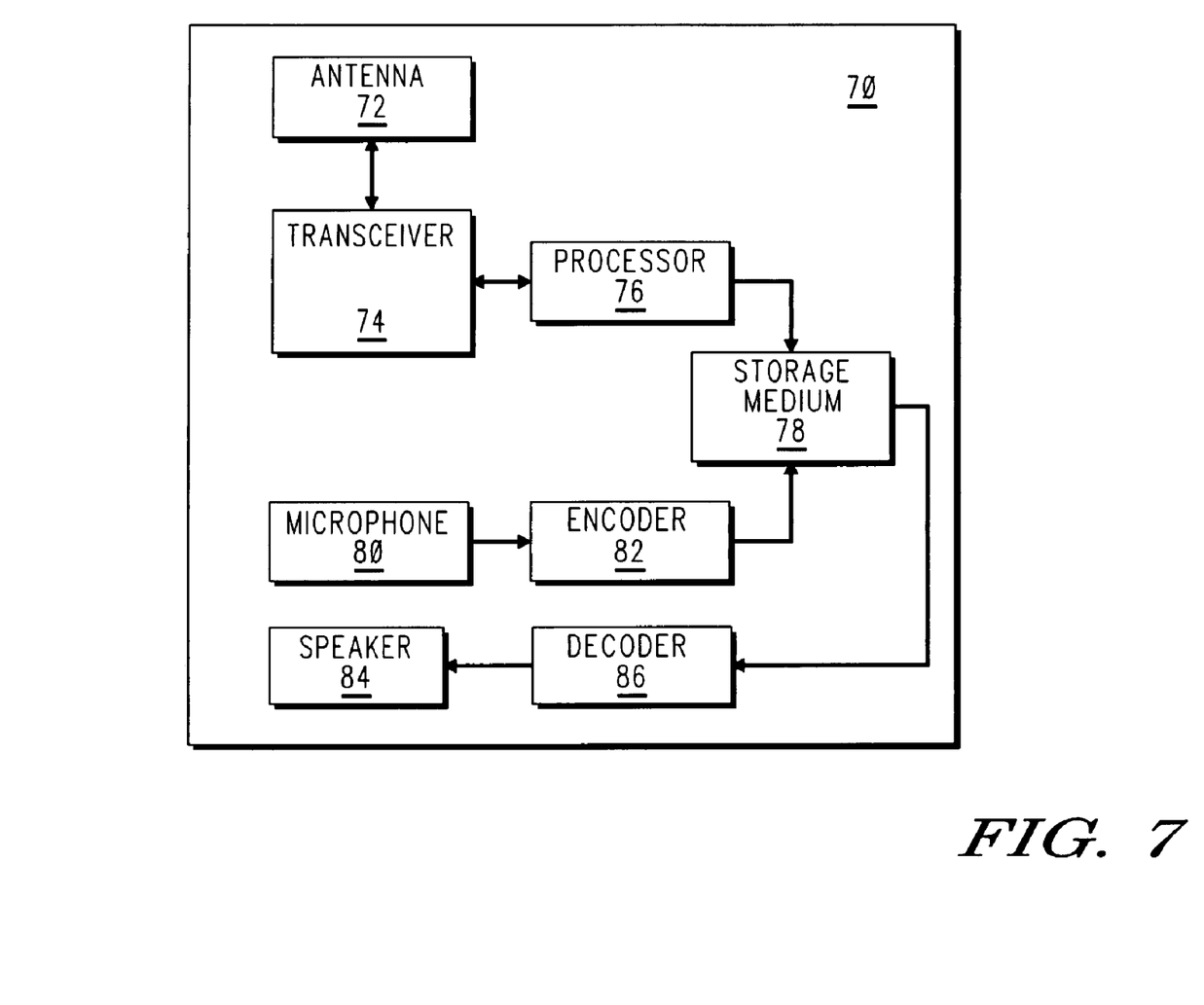
FIG. 7 is a block diagram of a communication unit in accordance with an embodiment of the present invention.

Referring to FIG. 7, one embodiment of a mobile communication unit 70 is illustrated. The unit 70 can receive signals from a base station or base stations (such as the cells 120, 130, and 140 of FIG. 6) at a transceiver 74 via an antenna 72. The transceiver 74 can also transmit information to a base station or base stations. Alternatively, a separate receiver and transmitter may be used in place of the transceiver 74. After receiving the signals, the transceiver 74 processes the signal using processor 76. In one embodiment, a microprocessor can perform the function of the processor 76 although other types of processors may be used including conventional general purpose single- or multi-chip microprocessors, digital signal processors, embedded microprocessors, microcontrollers and the like. The processor 76 converts the signals into data and performs the functions indicated by the signal including the monitoring steps previously described above. This may include an indication that a call is pending.

The data created by the processor 76 may be temporarily or permanently stored in a storage medium 78. The storage medium 78 may comprise any method of storing information. For example, the storage medium 78 may comprise an electrically erasable programmable read-only memory (EEPROM), read-only memory (ROM), random access memory (RAM), hard disks, floppy disks, laser disc players, digital video devices, compact discs, video tapes, audio tapes, magnetic recording tracks, and other techniques to store data. The data from the storage medium 78 may be used by a decoder 86 to provide an audio output via a speaker 84. The decoder 86 may comprise a digital-to-analog converter or the like. A user may also direct voice into a microphone 80 of the mobile unit 70. The voice data can be processed by an encoder 82 and stored in the storage medium 78 prior to processing by the processor 76. The encoder 82 may comprise an analog-to-digital converter or the like.

The processor 76 can be programmed to monitor at least one neighboring cell among a plurality of cells for a load condition on the at least one neighboring cell, monitor the at least one neighboring cell for a service capability and discontinue the monitoring of the at least one neighboring cell if a desired service capability fails to match the service capability of the at least one neighboring cell or if the load condition fails to meet a predetermined condition. The portable communication device can be a communication device such as a cellular phone that operates on at least one communication protocol selected among GSM, iDEN, UMTS, TDMA, GPRS/EDGE, CDMA, and WCDMA. The processor 76 can be further programmed to monitor the at least one neighboring cell for a signal quality indication and to discontinue the monitoring of the at least one neighboring cell if the signal quality indication falls below a predetermined threshold. Likewise the processor 76 can also be programmed to monitor a load condition for each of the service capabilities supported on the at least one neighboring cell. The processor 76 can further be programmed to cause the device to camp on the at least one neighboring cell if the desired service capability matches the service capability of the at least one neighboring cell, the load condition falls within the predetermined load condition, and the signal quality indication meets or exceeds the predetermined threshold.

Figure 8:
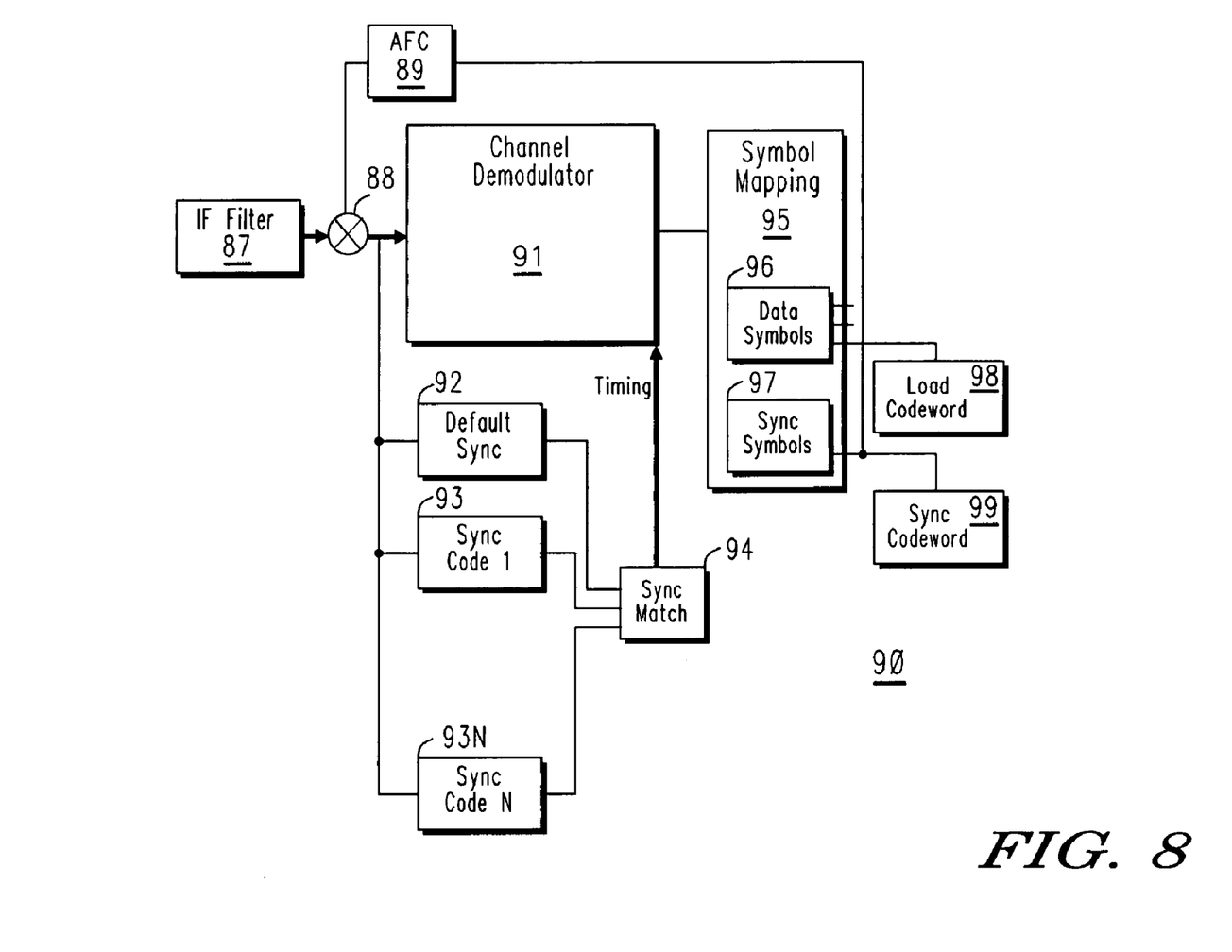
FIG. 8 is a block diagram of a receiver module in a communication unit in accordance with an embodiment of the present invention.

As discussed above, most wireless systems require neighbor cell monitoring, but some neighbor cells are not worth keeping track of due to their service loading. In accordance with another embodiment of the present invention as shown in FIG. 8, a receiver module 90 of a mobile communication unit can have the option not to monitor those neighbors and save power by extending its sleep periods using a two-part scheme. The first part includes a coarse channel loading decode scheme and the second part includes the fine channel loading decode scheme.

The coarse channel loading decode scheme uses a synchronization pattern or signal to synchronize the receiver module 90 to over-the-air channel slots and/or windows. Typically, a mobile communication unit first obtains synchronization before the unit can decode useful substantive information on an over-the-air slot. In accordance with one embodiment herein, the synchronization signal can be extended or used to also enable the mobile communication unit to know valuable information about the cell before proceeding with the whole slot decoding process. For instance, the mobile station can correlate against any one of many synchronization patterns or signals that may be inserted by the base station. If a recognizable or predetermined synchronization signal or pattern is found, the following information (not limited to this example) can be drawn about the cell status including, but not limited to:

A cell is heavily loaded.
A cell is heavily loaded on voice resources.
A cell is heavily loaded on packet resources.
A cell has no resources at the moment.
Other information.

Notice that the over-the-air slot did not need to have extra bits to indicate these basic conditions of the cell. The synchronization pattern can be simply changed to denote or indicate any desired predetermined information (Sync Codeword). An alternative would be to steal valuable bits from a slot (a traffic channel) which would inherently reduce the bandwidth needed for other valuable information. This alternative is generally not desirable and sometimes impossible (due to no available bits). Using the already existing bandwidth of the synchronization pattern (Sync symbols), the synchronization signal can now have multiple purposes including the ability to allow the mobile unit to synchronize itself to the base station and decode the slot as well as enabling a Base Station (cell) to indicate the status of its cells as well to the mobile unit Referring once again to the particular embodiment of FIG. 8, the receiver module 90 can include an intermediate frequency (IF) filter that provides a signal that is mixed at a mixer 88 with an automatic frequency control (AFC) signal from an. AFC 89. The mixer provides an output to both a channel demodulator 91 and a synchronization detector module or comparator scheme or a correlation scheme that can include detection schemes for detecting a default sync 92, a plurality of predetermined synchronization codes 93 (through 93N) and a sync matching module. 94. The output from the module 94 can then be used by the channel demodulator 91 and a symbol mapping module 95. Operationally, the mobile unit can correlate its sync detection pattern with the default sync (92) first. In most expected cases, the state of the cell will likely fall under the default sync category such as when the cell is operating under normal loading conditions. Synchronization symbols 97 generated by the symbol mapping module 95 can then provide synchronization codeword(s) 99 that provide coarse loading information or other information as noted above (heavily loaded, heavily loaded on voice resources, heavily loaded on packet resources, etc.).

Now that the coarse channel loading decode scheme has been extensively discussed above, the coarse channel loading decode scheme (in a base station or cell) can further indicate the presence of another codeword as part of its channel data. If the coarse channel loading decode scheme is not enough for the mobile unit to decide whether or not to skip the monitoring of a neighbor cell, then a second codeword 98 extracted from data symbols 96 from the symbol mapping module 95 (in a fine channel loading decode scheme) can be used to further break down the available service and the current loading on such services.

Operationally, the mobile communication unit can correlate the desired service the mobile unit is interested in using in conjunction with the fine and coarse channel loading decode codeword (98 and 99 respectively). Optionally, the mobile communication unit can look for the availability of a specific service using a matrix as shown below:

|  | Service ID 1 | Service ID 2 | Service ID 3 | ... | ... | Service ID N |
|---|---|---|---|---|---|---|
| Not supported | 1 | 0 | 0 | 0 | 0 | 1 |
| Available | 1 | 1 | 0 | 0 | 0 | 0 |
| Currently Unavailable | 0 | 0 | 1 | 1 | 1 | 1 |

The matrix rows and columns can be sent by a cell or base station or it can be fixed in a memory and known by the mobile communication unit. Using the matrix above, the codeword can indicate whether a service is not supported, available, or currently unavailable. The mobile unit can check the services it is interested in and based on their availability and the SQE of the cell, the mobile unit can either continue to monitor the cell or drop it from the list of neighbor cells. The codeword can have a length equal to double the list of services supported by the base station, but such arrangement is not necessarily required. Further note that the service IDs are for illustration only. They are not limited to a particular definition. For instance, on a UMTS channel, a service might mean a certain quality of service, spreading factors, or other information as desired. The code word in the matrix example shown above would be: 100001110000. Note that the currently unavailable services and available services are orthogonal to each other. This means that the codeword can represent one and the second is simply the complement of the first.

Figure 9:
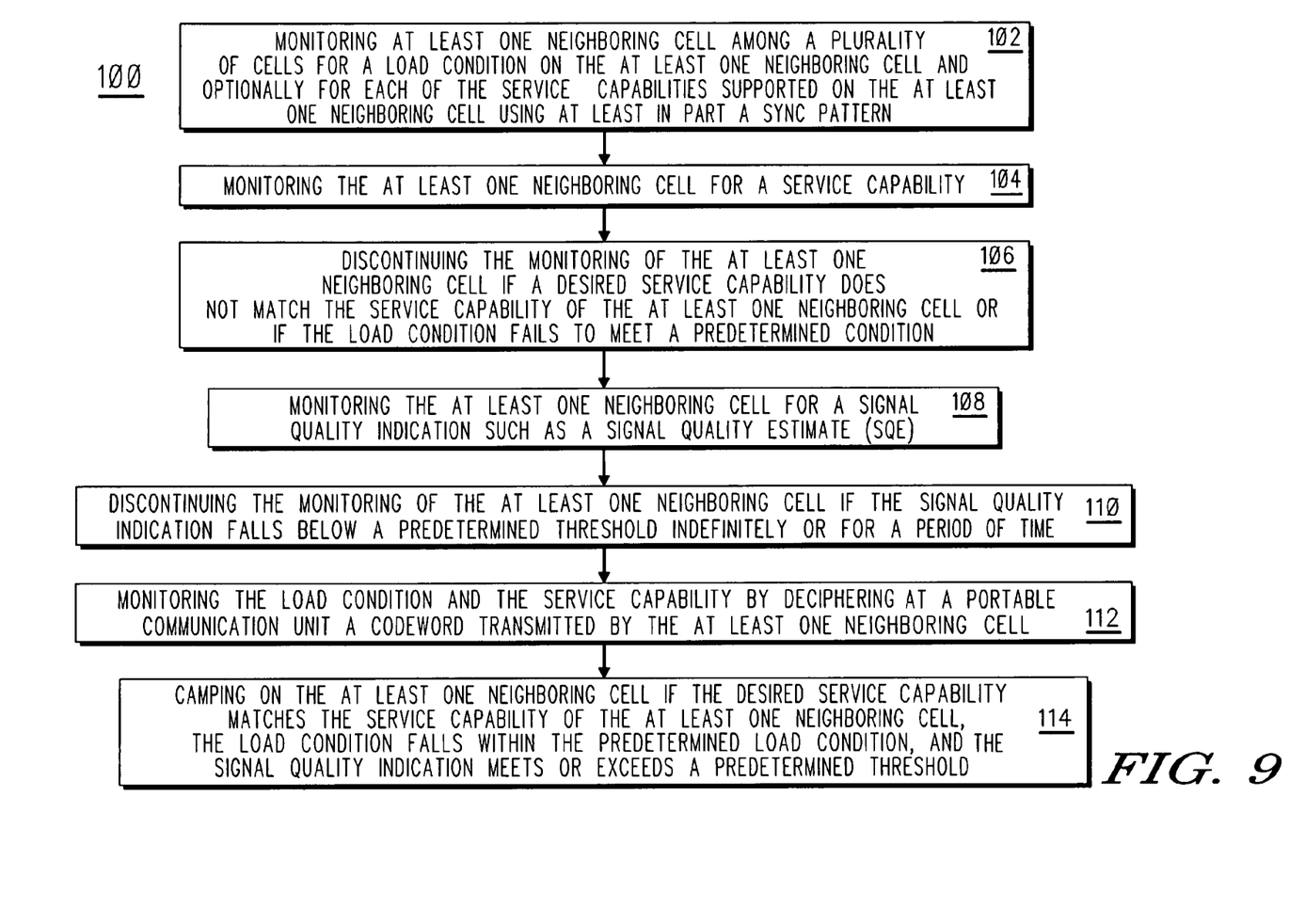
FIG. 9 is a flow chart illustrating a method of efficiently monitoring neighboring cells in a communication system in accordance with the present invention.

Referring to FIG. 9, an efficient method 100 of monitoring neighboring cells in a communication system can include the step 102 of monitoring at least one neighboring cell among a plurality of cells for a load measurement on the at least one neighboring cell, monitoring at step 104 the at least one neighboring cell for a service capability, and discontinuing at step 106 the monitoring of the at least one neighboring cell if a desired service capability does not match the service capability of the at least one neighboring cell or if the load measurement meets or exceeds a predetermined threshold. Note that the step of monitoring for the load measurement can be achieved by monitoring for a known synchronization pattern representative of a a predetermined load condition or measurement. Also note that the step of monitoring for the service capability can be achieved by deciphering a codeword that can be transmitted periodically in a known slot number (to avoid stealing valuable bits from every transmit slot). In one embodiment, the codeword only needs to be deciphered if a synchronization pattern fails to provide a mobile communication unit with enough information to make a decision. The service capabilities can be private call, dispatch, and short messaging service for example. The method 100 can further include the step 108 of monitoring the at least one neighboring cell for a signal quality indication and discontinuing the monitoring at step 110 of the at least one neighboring cell if the signal quality indication falls below a predetermined threshold. Note, the step of monitoring for the signal quality indication can be monitoring for a signal quality estimate (SQE) and the step of discontinuing the monitoring can include abstaining from monitoring the at least one neighboring cell for a period of time. Also note that the step of monitoring the load measurement can include the step of monitoring a load measurement for each of the service capabilities supported on the at least one neighboring cell. Monitoring the load measurement and the service capability can be optionally done at step 112 by deciphering by a portable communication unit a codeword transmitted by the at least one neighboring cell. The method 100 can further include the step 114 of camping on the at least one neighboring cell if the desired service capability matches the service capability of the at least one neighboring cell, the load measurement falls below the predetermined threshold, and the signal quality indication meets or exceeds the predetermined threshold.

In light of the foregoing description, it should be recognized that embodiments in accordance with the present invention can be realized in hardware, software, or a combination of hardware and software. A method and system for secure communications in a communication device according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

Note, embodiments can apply to mobile stations that monitor neighbor cells and that monitoring cells and requesting services is a fairly common process that is deployed on conventional systems. GSM, iDEN, UMTS, GPRS/EDGE, and CDMA all behave similarly to provide neighbor cells measurements for mobiles, but the scope of the invention is certainly not limited thereto.

Additionally, the description above is intended by way of example only and is not intended to limit the present invention in any way, except as set forth in the following claims.

What is claimed is:

1. An efficient method of monitoring neighboring cells in a communication system, comprising the steps of:
    monitoring at least one neighboring cell among a plurality of cells for a load condition on the at least one neighboring cell;
    monitoring the at least one neighboring cell for a service capability;
    discontinuing the monitoring of the at least one neighboring cell if a desired service capability fails to match the service capability of the at least one neighboring cell or if the load condition fails to meet a predetermined load condition; and wherein the step of monitoring the load condition comprises the step of decoding and matching a predetermined synchronization code indicative of the load condition.

2. The method of claim 1, wherein the method further comprises the step of monitoring the at least one neighboring cell for a signal quality indication.

3. The method of claim 2, wherein the method further comprises the step of camping on the at least one neighboring cell if the desired service capability matches the service capability of the at least one neighboring cell, the load condition falls within the predetermined load condition, and the signal quality indication meets or exceeds a predetermined threshold.

4. The method of claim 2, wherein the method further comprises the step of discontinuing the monitoring of the at least one neighboring cell if the signal quality indication falls below a predetermined threshold.

5. The method of claim 2, wherein the step of monitoring for the signal quality indication comprises the step of monitoring for a signal quality estimate.

6. The method of claim 1, wherein the step of discontinuing the monitoring comprises the step of abstaining from monitoring the at least one neighboring cell for a period of time.

7. The method of claim 1, wherein the step of monitoring for the service capability comprises the step of monitoring for the capabilities selected among the group comprising private call, dispatch, and short messaging service.

8. The method of claim 1, wherein the step of monitoring the load condition further comprises the step of monitoring a load condition for each of the service capabilities supported on the at least one neighboring cell.

9. The method of claim 8, wherein the steps of monitoring the load condition and the service capability further comprises the step of deciphering by a portable communication unit a codeword transmitted by the at least one neighboring cell.

10. The method of claim 9, wherein the method further comprises the step of transmitting the codeword periodically in a known slot number to avoid stealing bits from every transmit slot.

11. The method of claim 9, wherein the codeword is deciphered only if the synchronization code fails to provide the mobile station with enough information to make a decision.

12. The method of claim 9, wherein the codeword forecasts not only its current channel loading but also its projected service loading for subsequent timeslots.

13. A portable communication device, comprising:
a transceiver;
a processor coupled to the transceiver, wherein the processor is programmed to:
  monitor at least one neighboring cell among a plurality of cells for a load condition on the at least one neighboring cell;
  monitor the at least one neighboring cell for a service capability; and
  discontinue the monitoring of the at least one neighboring cell if a desired service capability does not match the service capability of the at least one neighboring cell or if the load condition fails to meet a predetermined load condition; and
a synchronization detector for detecting at least one among a plurality of synchronization codes representative of the load condition.

14. The portable communication device of claim 13, wherein the portable communication device is a cellular phone that operates on at least one communication protocol selected among Global System for Mobile Communications, Integrated Digital Enhanced Network, Universal Mobile Telecommunications System, Time Division Multiple Access, General Packet Radio Service/Enhanced Data Rates for Global System for Mobile Communications Evolution, Code Division Multiple Access, and Wideband Code Division Multiple Access.

15. The device of claim 13, wherein the processor is further programmed to monitor the at least one neighboring cell for a signal quality indication.

16. The device of claim 15, wherein the processor is further programmed to cause the device to camp on the at least one neighboring cell if the desired service capability matches the service capability of the at least one neighboring cell, the load condition falls within the predetermined load condition, and the signal quality indication meets or exceeds a predetermined threshold.

17. The device of claim 15, wherein the processor is further programmed to discontinue the monitoring of the at least one neighboring cell if the signal quality indication falls below a predetermined threshold.

18. The device of claim 15, wherein the signal quality indication comprises a signal quality estimate.

19. The device of claim 13, wherein the processor is programmed to monitor a load condition for each of the service capabilities supported on the at least one neighboring cell.

20. The device of claim 13, wherein the processor monitors the service capability by deciphering a codeword transmitted by the at least one neighboring cell.

21. The portable communication device of claim 13, wherein the portable communication device further comprises a channel decoder and a symbol mapper for decoding and mapping of at least one codeword indicative of at least one among the load condition and the service capability of the at least one neighboring cell.

22. A cellular communication system, comprising;
a portable communication unit having a transceiver and a processor coupled to the transceiver;
a plurality of cells, at least one cell among the plurality of cells including a transmitter that transmits an indication of a load measurement and a service capability for the at least one cell, wherein the processor in the communication unit is programmed to:
  monitor the at least one cell among a plurality of cells for the load measurement and the service capability on the at least one cell, wherein the monitoring for the load measurement comprises the step of decoding and matching a predetermined synchronization code indicative of the load condition; and
  discontinue the monitoring of the at least one cell if a desired service capability does not match the service capability of the at least one neighboring cell or if the load measurement meets or exceeds a predetermined threshold.

23. The cellular communication system of claim 22, wherein the processor is further programmed to monitor the at least one cell for a signal quality indication.

24. The cellular communication system of claim 23, wherein the processor is further programmed to discontinue the monitoring of the at least one cell if the signal quality indication falls below a predetermined threshold.

* * * * *